United States Patent [19]

Doyle

[11] 4,347,066

[45] Aug. 31, 1982

[54] REMOVAL OF CO AND UNSATURATED HYDROCARBONS FROM GAS STREAMS USING COPPER OXALATE COMPLEXES

[75] Inventor: Gerald Doyle, Whitehouse Station, N.J.

[73] Assignee: Exxon Research & Engineering Co., Florham Park, N.J.

[21] Appl. No.: 282,654

[22] Filed: Jul. 13, 1981

[51] Int. Cl.$^3$ ............................................. B01D 53/14
[52] U.S. Cl. ........................................... 55/56; 55/68; 423/246; 423/415 A
[58] Field of Search ...................... 55/56, 68; 423/246, 423/415 A

[56] References Cited

U.S. PATENT DOCUMENTS

| | | | |
|---|---|---|---|
| 2,604,391 | 7/1952 | Taylor et al. | 52/7 |
| 3,401,112 | 9/1968 | Dunlop et al. | 208/308 |
| 3,630,676 | 12/1971 | Davis | 23/204 |
| 3,754,047 | 8/1973 | Long et al. | 260/677 |
| 3,755,487 | 8/1973 | Jahnig et al. | 260/677 |
| 4,042,669 | 8/1977 | Johnson et al. | 423/246 |
| 4,048,292 | 9/1977 | Green | 423/415 |
| 4,279,874 | 7/1981 | Doyle | 423/246 |

OTHER PUBLICATIONS

A. P. Glaskova, Explosivstoffe, 23, 137–145, (1973).
W. J. Thomas et al., J. Appl. Chem., (London), 15, 17–28, (1965).

Primary Examiner—John Adee
Attorney, Agent, or Firm—James H. Takemoto

[57] ABSTRACT

A process for removing CO from a gas stream which comprises contacting the gas stream with a mixture of $Cu_2O$ and oxalic acid in an inert organic solvent. The process selectively removes CO from the gas stream and forms a novel cuprous oxalate complex of the formula $Cu_2(CO)_2C_2O_4$. $Cu_2(CO)C_2O_4$ can be further contacted with a feedstream containing unsaturated hydrocarbon L thereby displacing CO from the oxalate complex, removing L from the feedstream and forming a new complex $Cu_2(CO)_nL_mC_2O_4$ where n and m are numbers from 0 to 2.

15 Claims, No Drawings

REMOVAL OF CO AND UNSATURATED HYDROCARBONS FROM GAS STREAMS USING COPPER OXALATE COMPLEXES

BACKGROUND OF THE INVENTION

This invention relates to novel copper(I) oxalate complexes and their use for removing CO and unsaturated hydrocarbons from gas streams. More particularly, CO is removed from gas streams by using the reaction of CO with $Cu_2O$ and oxalic acid in an inert organic solvent to form $Cu_2(CO)_2C_2O_4$. CO can be displaced by reacting $Cu_2(CO)_2C_2O_4$ with unsaturated hydrocarbon.

U.S. Pat. No. 2,604,391 discloses a gas-producing charge for use in a non-detonating decomposition. The composition contains nitroguanidine or guanidine nitrate and a copper compound such as copper powder, cupric oxide, cuprous chloride or cuprous oxylate. A. P. Glaskova, Explosivstoffe, 23, 137–145 (1973) describes the effects of catalysts on the deflagration of certain classes of explosives. $Cu_2C_2O_4$ and its effects on ammonium perchlorate are shown in FIG. 8 and Table V.

It is known that certain copper(I) salts form complexes with olefins and acetylenes. For example, cuprous chloride is known to form complexes with both ethylene and acetylene. U.S. Pat. No. 3,401,112 teaches a method of separating a mixture of hydrocarbons having differing degrees of unsaturation using a copper(I) salt of the formula CuXA where XA is an anion, X is oxygen or fluorine and A is the remainder of the anion. In general, anions of the cuprous salts are anions of inorganic, organic or organo-inorganic acids wherein the $pK_a$ valves are in the order of 4.6 or less. CuXA forms a cuprous complex with said unsaturated hydrocarbon. U.S. Pat. Nos. 3,754,047 and 3,755,487 disclose a process for separating complexible ligands such as olefins, acetylenes, aromatics and CO from a feedstream using cuprous salts such as $CuAlCl_4$, $CuBF_4$, $CuOOCCF_3$, $CuPF_6$ and the like.

It is also known that certain cuprous salts can absorb CO from solutions. A review of the early literature and a detailed study of absorption of CO in aqueous cuprous ammonium lactate may be found in J. Appl. Chem. (London), 15, 17–28 (1965). Cuprous formate is an early example of a cuprous salt for CO absorption.

U.S. Pat. No. 3,630,676 describes a process for removing CO from mixed gas streams using a cuprous fluoroborate or cuprous fluorophosphate containing complex plus an aromatic and/or olefinic hydrocarbon. U.S. Pat. No. 4,042,669 discloses a process for removing CO from a gas mixture by treating the gas mixture with an absorbent containing a Cu(I) salt of an organic sulfonic acid or a dialkyl phosphate. U.S. Pat. No. 4,048,292 relates to a method of removing CO from $CO_2$-free gas streams using a liquid absorbent system containing a copper ammonium formate or acetate.

SUMMARY OF THE INVENTION

It has been discovered that cuprous oxide can react with oxalic acid and carbon monoxide to form a novel cuprous carbonyl oxalate complex wherein the carbonyl may be displaced by an unsaturated hydrocarbon. The new composition of matter comprises a cuprous oxalate complex of the formula $Cu_2(CO)_nL_mC_2O_4$ where L is an unsaturated hydrocarbon containing at least one non-aromatic unsaturation capable of forming a Cu-L bond and n and m are numbers from 0 to 2. In one embodiment, n is 2 and m is 0. In another embodiment, n is 0 or 1, preferably 0, and m is from 1 to 2.

It has also been discovered that the reaction of $Cu_2O$ with CO and oxalic acid provides a method of selectively absorbing CO. Accordingly, the present process for removing CO from a gas stream comprises contacting the gas stream with a mixture of $Cu_2O$ and oxalic acid in an inert organic solvent.

In another embodiment, unsaturated hydrocarbons containing at least one non-aromatic unsaturation are removed from feedstreams by a process which comprises contacting the feedstream with a mixture of $Cu_2(CO)_2C_2O_4$ in an inert organic solvent.

CO can be selectively removed from gas streams even if they contain unsaturated hydrocarbons because of the greater thermodynamic stability of the carbonyl complex. On the other hand, carbonyl can be displaced from $Cu(CO)_2C_2O_4$ with unsaturated hydrocarbon L by forcing the

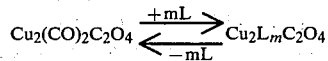

equilibrium in favor of $Cu_2L_mC_2O_4$ using excess L or removing CO.

DETAILED DESCRIPTION OF THE INVENTION

Cupric oxalate is a well known Cu(II) complex. Cuprous oxalate complexes, however, cannot be prepared by ordinary methods, e.g., reacting $Cu_2O$ and oxalic acid in aqueous solution. If, however, $Cu_2O$ and oxalic acid are contacted in an inert organic solvent in the presence of CO, a cuprous carbonyl oxalate complex of the formula $Cu_2(CO)_2C_2O_4$ is formed, and this reaction forms the basis of the present invention for selectively removing CO from gas streams.

Suitable inert organic solvents are ethers, saturated aliphatic hydrocarbons, aromatic hydrocarbons, esters, amides, ketones and sulfolanes. Preferred solvents are ethers and saturated aliphatic hydrocarbons substituted by halogen. Depending on the specific solvent employed, cuprous oxalate, $Cu_2C_2O_4$, may be observed as an intermediate. On prolonged contact with CO, $Cu_2C_2O_4$ is converted to $Cu_2(CO)_2C_2O_4$. Solvents wherein $Cu_2(CO)_2C_2O_4$ forms directly without precipitation of $Cu_2C_2O_4$ are preferred for purposes of removing CO from gas streams. The presence of the intermediate $Cu_2C_2O_4$ compound may be detected by observing the color changes upon reaction. $Cu_2C_2O_4$ is a grey-violet color whereas $Cu_2(CO)_2C_2O_4$ is a white to light grey color.

$Cu_2O$ and oxalic acid are preferably present in approximately stoichiometric amounts, i.e., about 1:1 on a molar basis. $Cu_2O$ and oxalic acid may, however, be present in molar ratios of from 0.1 to 10.0 $Cu_2O$:oxalic acid. The total amounts of $Cu_2O$ and oxalic acid are not critical and may range from about 0.01 M to about 3 M. Concentrations of 0.1 to 2 M are preferred for maximizing the rate of CO absorption.

CO pressures are not critical and may range from 0.1 to 300 atm. If other gases are present, the CO partial pressure covers the same range, i.e., 0.1 to 300 atm. Preferred CO pressures or partial pressures are from 1 to 100 atm. CO absorption can occur over broad temperatures of from −100 to +100, preferably 0° to 40° C. Generally, as one goes to higher operating temperatures, it is preferred to increase the CO pressure. The increased pressure helps to stabilize the cuprous complex against decomposition through loss of CO.

The CO containing gas stream may also contain other gases such as $N_2$, $CO_2$, alkanes, alkenes, alkynes, aromatics, $H_2O$, $H_2$, $SO_2$, $SO_3$, $NH_3$, nitrogen oxides and the like. CO is selectively absorbed and gases such as ethylene, acetylene, $CO_2$ and $H_2O$ do not affect selectively or CO reactivity even at relatively high concentrations so long as excess CO is present. Oxygen in amounts greater than about 5 vol % should be avoided since significant amounts of $O_2$ can lead to oxidation of the Cu(I) complex.

In order to desorb CO, the mixture containing $Cu_2(CO)_2C_2O_4$ may simply be heated to temperatures sufficient to decompose the carbonyl complex to $Cu_2C_2O_4$, preferably temperatures of from about 40° to 180° C. Alternatively, $Cu_2(CO)_2C_2O_4$ can be isolated and heated at the above cited temperatures. The cyclic process is represented by the reaction sequence:

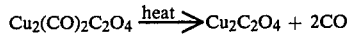

When $Cu_2(CO)_2C_2O_4$ is contacted with a substantially CO-free (<10 vol % CO) feedstream containing unsaturated hydrocarbon L in the inert organic solvents set forth above, the unsaturated hydrocarbon is removed from the feedstream by a displacement reaction illustrated by the following equilibria:

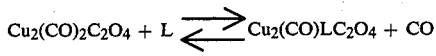

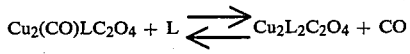

These equilibria may be forced in favor of $Cu_2(CO)LC_2O_4$ or $Cu_2L_2C_2O_4$ by either excess L or removing CO from the system. In some cases, non-stoichiometric complexes containing L may be obtained, e.g., $Cu_2$(diphenylacetylene)$_{1.5}C_2O_4$. Depending on thermodynamic considerations and reaction conditions, either the mixed CO-L or the fully displaced complex containing only L may be obtained. In some instances, it is possible to prepare $Cu_2L_mC_2O_4$ directly from $Cu_2O$, oxalic acid and L. For example, a mixture of $\phi$—C≡C—$\phi$ or

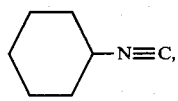

$H_2C_2O_4$ and $Cu_2O$ yields $Cu_2(\phi-C\equiv C-\phi)_{1.5}C_2O_4$ or

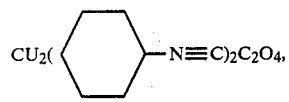

respectively, without going through $Cu_2(CO)_2C_2O_4$. The preferred method, however, is to react L with $Cu_2(CO)_2C_2O_4$, especially if L is a low molecular weight unsaturated hydrocarbon such as ethylene or acetylene. Preferred temperatures for the displacement reaction are from 25° to 150° C., especially 25° to 100° C. It is also desirable to have a molar excess of L over $Cu_2(CO)_2C_2O_4$ with excesses up to 100 fold or more being preferred.

Preferred L are unsaturated hydrocarbons containing at least one ethylenic, acetylenic or isonitrilic unsaturation, more preferably $C_2$-$C_{30}$ alkene, $C_2$-$C_{30}$ alkyne, $C_8$-$C_{30}$ arylalkene, $C_8$-$C_{30}$ arylalkyne, $C_4$-$C_{14}$ cycloalkene isonitrile of the formula R—N≡C where R is $C_1$-$C_{20}$ alkyl, $C_3$-$C_{12}$ cycloalkyl, $C_7$-$C_{20}$ aralkyl or $C_6$-$C_{10}$ aryl, and most preferably $C_2$-$C_{20}$ alkene, $C_2$-$C_{20}$ alkyne, $C_8$-$C_{20}$ arylalkene, $C_8$-$C_{20}$ arylalkyne, $C_4$-$C_{10}$ cycloalkene or isonitrile of the formula R—N≡C where R is $C_1$-$C_{10}$ alkyl, $C_6$-$C_{10}$ cycloalkyl, $C_7$-$C_{14}$ aralkyl or $C_6$-$C_{10}$ aryl.

The process of the invention may be carried out in a batchwise or continuous mode. A preferred embodiment comprises bubbling the CO containing gas stream through a gas dispersion device into a stirred reaction vessel containing inert solvent, $Cu_2O$ and oxalic acid. The flow rate of the gas stream leaving the vessel is monitored for CO content and the flow rate is adjusted if necessary to ensure complete CO removal.

The present process has the advantages of selectivity to CO absorption and ease of regeneration of the absorbing medium thereby minimizing energy costs. Moreover, by appropriate adjustment of reaction conditions, the CO-complex can be used to remove unsaturated hydrocarbon. The invention is further illustrated by the following examples.

EXAMPLE 1

A flask equipped with a dropping funnel and a gas bubbler was charged with 2.86 g of $Cu_2O$ and 75 ml of tetrahydrofuran (THF). A solution containing 1.80 g oxalic acid in 50 ml THF was added dropwise over a 30 minute period while a stream of CO was bubbled through the mixture. The red color of $Cu_2O$ changed to a whitish color over a period of 4 hours. The insoluble $Cu_2(CO)_2C_2O_4$ was isolated by filtration and characterized by elemental analysis and infrared (IR) spectroscopy.

EXAMPLE 2

The procedure of Example 1 was followed except that diethyl ether was substituted for THF. When CO was bubbled into the red $Cu_2O$ containing mixture, a color change to grey-violet was observed after several hours. A nearly quantitative yield of $Cu_2C_2O_4$ was obtained. The product was characterized by elemental analysis and IR spectroscopy. Prolonged contact of $Cu_2C_2O_4$ with CO results in conversion to $Cu_2(CO)_2C_2O_4$.

EXAMPLE 3

A mixture of 2.86 g $Cu_2O$, 14.24 g diphenylacetylene and 75 ml $CH_2Cl_2$ was stirred at room temperature while a solution of 1.80 g oxalic acid in 50 ml $CH_2Cl_2$ was added dropwise over a period of 30 minutes. The mixture was then stirred an additional four hours during which time the red color of the $Cu_2O$ gradually changed to white. The insoluble material which was isolated by filtration was analyzed and found to have the composition $Cu_2(C_6H_5C\equiv CC_6H_5)_{1.5}C_2O_4$. The complex was further characterized by infrared spectroscopy.

EXAMPLE 4

An experiment identical to that described in Example 3 was carried out except that 4.36 g cyclohexylisontrile was substituted for the diphenylacetylene. In this case the $Cu_2O$ gradually dissolved and a clear solution was obtained. By evaporation under vacuum, a white crystalline material was isolated. This material was recrystallized from a methylene chloride-pentane mixture and identified as

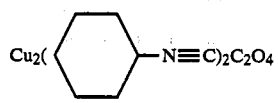

by elemental analysis and infrared and n.m.r. spectroscopy.

EXAMPLE 5

Ethylene gas was bubbled through a suspension of 2.71 g $Cu_2(CO)_2C_2O_4$ in 100 ml THF for several hours at room temperature. After this period the suspended solids were isolated by filtration. This product was identified as $Cu_2(CO)(C_2H_4)C_2O_4$.

EXAMPLE 6

A mixture of 2.71 g $Cu_2(CO)_2C_2O_4$, 2.54 g 1-hexene and 100 $CH_2Cl_2$ was heated at reflux for several hours under nitrogen. After this period the suspended solids were filtered off and dried under vacuum. This complex has the composition $Cu_2(1-hexene)_{1.5}C_2O_4$.

EXAMPLE 7

A mixture of 2.71 g $Cu_2(CO)_2C_2O_4$ and 1.84 g norbornadiene in 100 ml $CH_2Cl_2$ was refluxed for four hours under nitrogen. The solid material was recovered by filtration and was characterized as

EXAMPLE 8

In the same manner as described in Example 7, 2.71 g $Cu_2(CO)_2C_2O_4$ was reacted with 1.888 g norbornylene forming

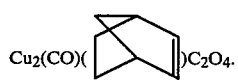

In addition, a small amount of a soluble complex with the composition

was obtained.

EXAMPLE 9

A mixture of 2.71 g $Cu_2(CO)_2C_2O_4$ and 4.32 g 1,5-cyclooctadiene (COD) in 100 ml $CH_2Cl_2$ was heated to reflux for four hours under nitrogen. The insoluble $Cu_2(CO)_2C_2O_4$ gradually went into solution. After cooling, the mixture was filtered to remove a small amount of residual solids and the clear filtrate was partially evaporated under vacuum to give a white microcrystalline precipitate. This was analyzed to be $Cu_2(COD)_{1.5}C_2O_4$.

EXAMPLE 10

A stream of a gas mixture containing approximately 60% nitrogen and 40% carbon monoxide was bubbled through a suspension of 2.86 g $Cu_2O$ and 1.80 g oxalic acid in 75 ml tetrahydrofuran at room temperature. After three hours the red color of the $Cu_2O$ had disappeared and a white solid with the composition $Cu_2(CO)_2C_2O_4$ was formed.

EXAMPLE 11

An experiment identical to that described in Example 10 was carried out except that the gas mixture consisted of 18.9% CO, 42.4% $H_2$, 14.4% $CH_4$, 14.7% $CO_2$ and 9.6% $C_2H_6$. In this case $Cu_2(CO)_2C_2O_4$ was formed after four hours illustrating the selective removal of CO from the mixture.

EXAMPLE 12

Two grams of $Cu_2(CO)_2C_2O_4$ was heated to 120° for four hours in xylene. After cooling the solids were analyzed and it was found the CO had been essentially entirely removed and that only $Cu_2C_2O_4$ remained. A gas mixture containing 60% $H_2$ and 40% CO was then passed through the suspension for several hours at room temperature and the solids were again analyzed and found to contain mostly $Cu_2(CO)_2C_2O_4$. This illustrates that the complexed CO can be removed by heating and that the complex can be reused at lower temperatures to absorb CO.

EXAMPLE 13

A mixture of 2.71 g $Cu_2(CO)_2C_2O_4$ and 4.32 g cyclooctadiene in 100 ml methylene chloride was heated at 40° C. until the solids had completely dissolved and an infrared spectrum indicated none of the carbonyl complex remained. The solution was then cooled and a gas mixture consisting of 50% hydrogen and 50% CO was passed through the solution. Solid $Cu_2(CO)_2C_2O_4$ began to form immediately illustrating a cyclic process for CO absorption from gas mixtures.

EXAMPLE 14

A solution of 1 gram $Cu_2(COD)_{1.5}C_2O_4$ was dissolved in 30 ml THF and was placed in a 70 cc stainless steel pressure vessel. This was pressurized to 1000 psi with a gas mixture consisting of 50% CO and 50% hydrogen and was stirred at room temperature for several hours. After depressurization the contents of the vessel were analyzed and it was found that essentially all the $Cu_2(COD)_{1.5}C_2O_4$ had been converted to $Cu_2(CO)_2C_2O_4$ thereby removing a portion of the CO from the mixture.

What we claim is:

1. A process for selectively removing CO from a CO containing gas stream which comprises contacting the gas stream with a mixture of $Cu_2O$ and oxalic acid in an inert organic solvent.

2. The process of claim 1 wherein the mixture has a temperature of from $-100°$ to $+100°$ C.

3. The process of claim 1 wherein the gas stream has a CO pressure or partial pressure of from 0.1 to 300 atm.

4. The process of claim 1 wherein the amounts of $Cu_2O$ and oxalic acid range from about 0.01 M to 3 M.

5. The process of claim 1 where the inert solvent is an ether, saturated aliphatic hydrocarbon, aromatic hydrocarbon, ester, amide, ketone or sulfolane.

6. The process of claim 1 wherein CO is removed by forming a complex of the formula $Cu_2(CO)_2C_2O_4$.

7. The process of claim 6 wherein the complex is heated to a temperature sufficient to remove CO thereby forming $Cu_2C_2O_4$.

8. The process of claim 7 wherein the $Cu_2C_2O_4$ mixture is cooled and contacted with gas stream containing CO.

9. A process for removing unsaturated hydrocarbons containing at least one non-aromatic unsaturation from feedstreams which comprises contacting the feedstream with a mixture of $Cu_2(CO)_2C_2O_4$ in an inert organic solvent.

10. The process of claim 9 wherein the unsaturated hydrocarbon contains at least one ethylenic, acetylenic or isonitrilic unsaturation.

11. The process of claim 9 wherein the feedstream is substatially CO-free.

12. The process of claim 9 wherein the temperature is from 25° to 150° C.

13. The process of claim 9 wherein a complex of the formula $Cu_2(CO)_nL_mC_2O_4$ where n and m are numbers from 0 to 2 and L represents the unsaturated hydrocarbon, is formed.

14. The process of claim 13 wherein L is $C_2$–$C_{30}$ alkene, $C_2$–$C_{30}$ alkyne, $C_8$–$C_{30}$ arylalkene, $C_8$–$C_{30}$ arylalkyne, $C_4$–$C_{14}$ cycloalkene or isonitrile of the formula $R-N\equiv C$ where R is $C_1$–$C_{20}$ alkyl, $C_3$–$_{12}$ cycloalkyl, $C_7$–$C_{20}$ aralkyl or $C_6$–$C_{10}$ aryl.

15. The process of claim 13 wherein n is 0 and m is from 1 to 2.

* * * * *